No. 811,037. PATENTED JAN. 30, 1906.
W. C. CREVELING.
DANGER SIGNAL.
APPLICATION FILED DEC. 8, 1904.
2 SHEETS—SHEET 1.
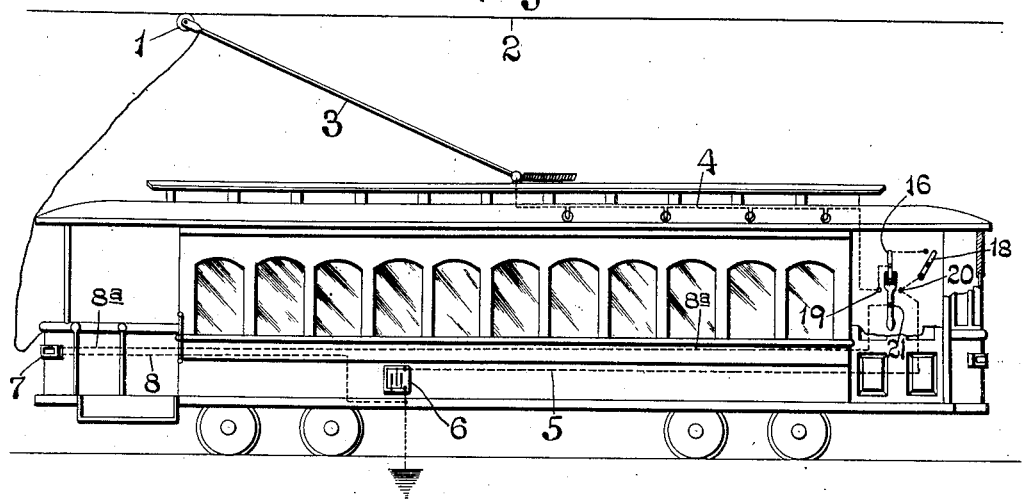
Fig. 1.
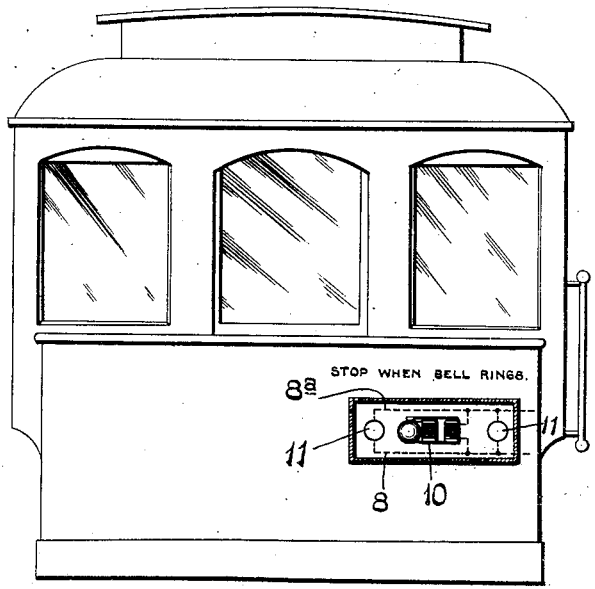
Fig. 2.
Witnesses
A. J. McCauley
B. F. Funk
Fig. 3.
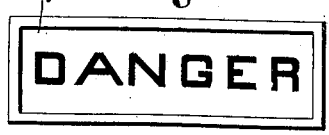
Inventor:-
William C. Creveling
BY Bakewell Cornwall
ATT'Y'S.

No. 811,037. PATENTED JAN. 30, 1906.
W. C. CREVELING.
DANGER SIGNAL.
APPLICATION FILED DEC. 8, 1904.
2 SHEETS—SHEET 2.
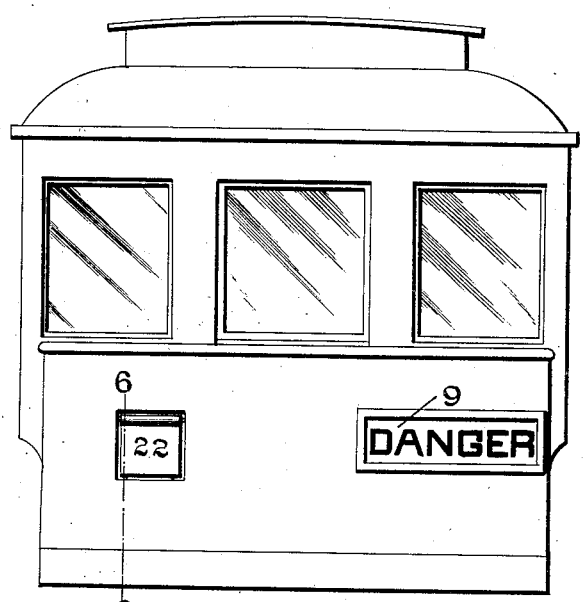
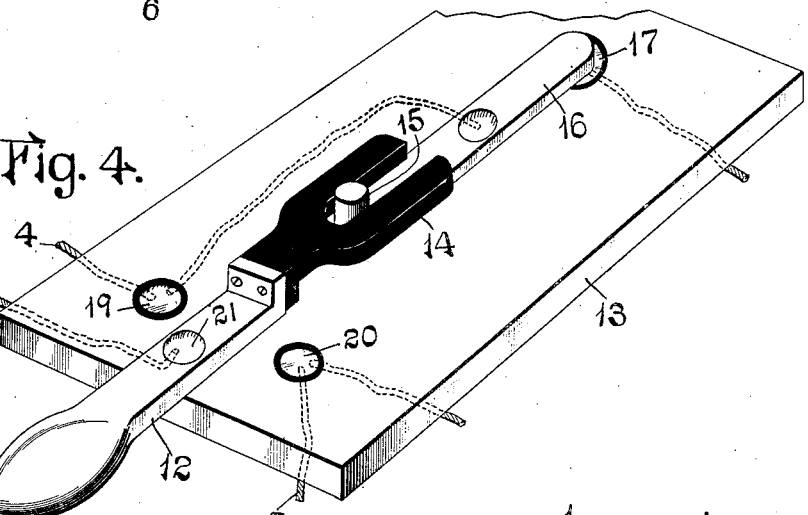
Witnesses
A. J. McCauley
B. J. Funk
Inventor:-
William C. Creveling
BY Bakewell Cornwall
ATTY'S.

UNITED STATES PATENT OFFICE.

WILLIAM C. CREVELING, OF ST. LOUIS, MISSOURI.

DANGER-SIGNAL.

No. 811,037.   Specification of Letters Patent.   Patented Jan. 30, 1906.

Application filed December 8, 1904. Serial No. 235,975.

*To all whom it may concern:*

Be it known that I, WILLIAM C. CREVELING, a citizen of the United States, residing at the city of St. Louis, State of Missouri, have invented a certain new and useful Improvement in Danger-Signals, of which the following is a full, clear, and exact description, such as will enable others skilled in the art to which it appertains to make and use the same, reference being had to the accompanying drawings, forming part of this specification, in which—

Figure 1 is a side elevational view of a car, a part of the vestibule being broken away to show the interior arrangement of the switch, the conductors comprising the circuits being shown in dotted lnes. Fig. 2 is an end view of a car with a signal applied, the front panel being removed. Fig. 3 is an elevational view of the signal-panel. Fig. 4 is an enlarged detail view of the switch and the coöperating switch-points. Fig. 5 is an end view of a car, showing a form of automatic circuit-closer; and Fig. 6 is a sectional view on the line 6 6 of Fig. 5.

This invention relates to signals, and particularly to a signal adapted to be applied to a car or other vehicle, which signal may be so controlled as to indicate when the car or vehicle has stopped and also when a car or vehicle is in close proximity thereto and moving in a direction opposite to the direction of movement of the particular car on which the signal is utilized.

During the operation of surface railways it frequently happens that persons alighting from one car are struck by a car moving in an opposite direction in crossing the tracks alongside of the car from which they have alighted. It also happen after a car has descended an incline that the trolley will become displaced from the trolley-wire, causing the car to stop. If for this or for any other reason a car should stop at the bottom of an incline and the next succeeding car should happen to be at the top of the incline, the motorman of the next succeeding car might attempt to make up the distance between his car and the preceding car by permitting his car to pass down the incline by gravity. If the lights in the preceding car should happen to be extinguished on account of the lack of current in the trolley-wire, the said succeeding car would be likely to run into the preceding one unless some means were used for notifying the motorman of its location.

It is the purpose of my invention to provide means whereby the positions of a car or cars will be apparent whenever the car or cars stop, so that the liability of the cars accidentally running into each other will be avoided.

With these objects in view the invention consists in certain novel combinations of parts and details of construction, all of which will be specifically set forth hereinafter and illustrated in the drawings, in which—

1 designates an overhead trolley receiving current from the trolley-wire 2 and communicating the same into the interior car-circuits through the trolley-pole 3.

4 designates the lamp-circuit, which circuit is adapted to energize a storage-battery circuit 5 to charge a storage battery 6, the current then passing to the ground. The storage battery 6 is provided for the purpose of energizing a circuit adapted to operate an audible and visible signal or signals at either or both ends of the car. In Fig. 1 I have illustrated a signal 7 at one end of the car, which may be energized by the storage battery 6 through a conductor 8.

The signal 7 preferably consists of a housing or casing having a translucent panel 9, on which is displayed suitable characters indicative of danger, and behind this panel and within the housing or casing is a bell 10 in multiple with a plurality of lamps 11 in the signal-circuit including the conductor 8 and the conductor 8$^a$, leading back through the car to a suitable switch arranged conveniently accessible from the vestibule of the car. This switch is illustrated in detail in Fig. 4 and is illustrated as comprising a switch-lever 12, pivoted to to a suitable base 13 and having a bifurcated end 14, which bifurcation preferably consists of insulation. Between the separated members of the bifurcated end is a projection 15 on the end of a pivoted member 16, shown as a bar. One end of this bar is adapted to move into and out of engagement with a contact 17 in the storage-battery circuit, which storage-battery circuit may be broken by a cut-out 18. If it is desired to energize the storage battery 6, the cut-out 18 will be operated to close the circuit, so that the current may pass through the trolley-pole into the lamp-circuit, through the contact 19 and into the bar 16, thence through the contact 17, through the closed cut-out, down through the conductor 5 into the battery, and then ground.

In actual practice the current passing through the conductor 5 into the battery 6 will be equal to about one hundred and ten volts or equal to the number of volts requisite to raise the filaments in the lamps of the lamp-circuit to incandescence. Ordinarily there are about five lamps in series in the lamp-circuit, so that five hundred and fifty volts are required to energize all of them. In carrying out my invention it is contemplated at this time to dispense with one of these lamps and utilize the current which would be applied thereto for accumulation in the storage battery.

By reference to Figs. 1 and 5 it will be observed that I have provided a contact 20 in the storage-battery circuit, and if it is desired to energize the signal through the storage-battery circuit the operator may grasp the switch-lever 12 so as to throw said lever onto the contact 20, which operation will simultaneously throw the bar 16 off the contact 17, so that by a single operation the signal-circuit will be cut into the storage-battery circuit and the lamp-circuit will be cut out of the storage-battery circuit. As soon as the signal-circuit is broken by the switch-lever 12 the storage-battery circuit will be cut in with the lamp-circuit unless broken by the cut-out 18. Thus it will be apparent that the storage battery will be accumulating current during the time that the signal is not energized unless the circuit is broken by the cut-out 18. I have also provided means whereby the signal or signals may be energized directly from the lamp-circuit. This is accomplished by operating the switch-lever 12 so that its forward end below the insulated portion will engage the contacts 19. In such a position the current will flow through the lamp-circuit to contact 19 through the lever 12, then from the contact 21 at the pivotal point of the lever, through the conductor 8$^a$ to the signal, then through the conductor 8 to ground.

In the actual operation of the device the signal will generally be operated directly from the lamp-circuit whenever the car stops. At a convenient point on the end of the car I intend to have a suitable inscription in the nature of a warning—for example, "Stop when bell rings." As soon as the car stops the operator will control the switch so as to close the signal-circuit, which will cause the bell to ring to attract the attention of the persons about to pass in rear of the car, and at night the lights in the signal will cause the characters on the panel 9 to become visible, so as to warn persons against passing in rear of the car.

When it it desired to break the circuit, the switch-lever will be moved to the position shown in Fig. 1, and if the battery 6 needs replenishing the cut-out 18 may be closed and the current will pass from the lamp-circuit to the battery, as heretofore explained. The battery-circuit will generally be used as an auxiliary circuit—that is to say, the battery-circuit will be employed in the event that the current gives out in the trolley. This is an important feature. For example, suppose a car should happen to be at the bottom of an incline when the power becomes exhausted over the entire system. The operator may then cut out the lamp-circuit through the medium of the switch-lever and cut in the storage-battery circuit by means of the cut-out 18, so that the signal will be displayed. Thus the operator on the succeeding car passing down the incline by gravity would be warned of the presence of the car at the bottom of the incline on account of the signal being displayed, and thus a rear-end collision would be avoided.

In Figs. 5 and 6 I have shown a form of automatic circuit-closer comprising a shutter 22, which is hinged to one end of the car, so as to normally close an opening in the dashboard thereof. This shutter constitutes a movable contact in the path of the signal-circuit and is adapted to abut against a rigid contact 23 at the lower edge of the opening. This shutter 22 is arranged to be positioned in the front of the car, and the force of the air as the car moves forwardly will be sufficient to hold the contact 22 away from the contact 23, as shown in Fig. 6. As soon as the car stops the contact 22 will automatically drop by gravity, so as to abut against the contact 23, and thus complete the signal-circuit, so that the signal will be displayed.

It is to be understood that the signals may be arranged so as to become excited from a single source of energy and by one operation. This may be desirable under certain conditions—as, for example, where it is required to notify the operator on a car moving in an opposite direction that the car on which the signals are arranged has stopped. By notifying the motorman of an oncoming car that the car on which the signals are arranged has stopped the motorman will have ample opportunity to get his car under control before passing the car showing the signals.

Having thus described the invention, what I claim as new, and desire to secure by Letters Patent, is—

1. The combination with a car provided with a lamp-circuit, of a storage battery in the car, a storage-battery circuit, a signal, a signal-circuit, a switch for throwing the storage-battery circuit into the lamp-circuit and for including the signal-circuit in the storage-battery circuit, and a separate cut-out for breaking the storage-battery circuit when the switch is in position to include the storage-battery circuit in the lamp-circuit; substantially as described.

2. The combination with a car having a source of electrical energy adapted to be energized through the trolley, of a storage battery, a storage-battery circuit, means for including the storage-battery circuit in the source of electrical energy, a signal-circuit, and means for including the signal in either the source of electrical energy or the storage-battery circuit when the storage-battery circuit is not included in the source of electrical energy; substantially as described.

3. The combination with a car provided with a source of electrical energy, of a storage battery in the car, a storage-battery circuit, a signal-circuit, a switch for throwing the storage-battery circuit into the source of electrical energy, and for including or cutting out the signal-circuit in or from the source of electrical energy, and a separate cut-out for breaking the storage-battery circuit when the switch is in position to include the storage-battery circuit in the source of electrical energy; substantially as described.

4. A danger-signal including an energizing-circuit, a signal-circuit, a storage-battery circuit, a single switch for throwing the energizing-circuit alternately into the signal-circuit and the storage-battery circuit, and a cut-out in one of the circuits; substantially as described.

5. A danger-signal including an energizing-circuit, a storage-battery circuit, a signal-circuit, and a switch mechanism for alternately throwing the energizing-circuit in either of the other circuits, said switch mechanism including a lever having an insulated bifurcated end, and a swinging member engaging the bifurcated end of said lever; substantially as described.

6. The combination with a car, of a danger-signal on the car, a signal-circuit, an energizing-circuit, a stationary contact in the path of the signal-circuit, and a swinging contact in the path of the energizing-circuit, said swinging contact being adapted to contact with the stationary contact only when the car is not in motion; substantially as described.

7. A danger-signal including an energizing-circuit, a signal-circuit, a storage-battery circuit, and a single switch for throwing the energizing-circuit alternately into the signal-circuit and the storage-battery circuit, said switch comprising a lever 12 having an insulated bifurcated end, and a pivoted bar having one end in engagement with the bifurcated end of the lever and the other end free to engage a switch-point; substantially as described.

8. The combination with a car having a source of electrical energy and a lamp-circuit in connection therewith, of a storage battery, a storage-battery circuit, a signal-circuit, a switch movable to include the storage-battery circuit in the source of electrical energy, said switch being also movable to a position to include the signal-circuit in the storage-battery circuit and to simultaneously cut out the storage-battery circuit from the source of electrical energy, and a signal in the signal-circuit comprising a casing having a translucent panel, a bell in the casing and included in the circuit, and lamps in the circuit with the bell; substantially as described.

In testimony whereof I hereunto affix my signature, in the presence of two witnesses, this 2d day of December, 1904.

WILLIAM C. CREVELING.

Witnesses:
B. F. FUNK,
GEORGE BAKEWELL.